United States Patent [19]

McCall et al.

[11] 4,415,181

[45] Nov. 15, 1983

[54] LOW GROUND CLEARANCE TRAILER

[76] Inventors: Charles F. McCall, 1703 Dorchester; William P. Seelye, 220 Nicki La., both of Arlington, Tex. 76014

[21] Appl. No.: 319,258

[22] Filed: Nov. 9, 1981

[51] Int. Cl.³ ............................................. B60G 11/18
[52] U.S. Cl. .................................... 280/700; 280/465; 280/789; 267/57
[58] Field of Search ................... 280/204, 425 A, 463, 280/465, 700, 721, 664, 789, 790; 267/57.1 A, 57 (U.S. only); 403/96, 97, 259-261, 373, 380

[56] References Cited

U.S. PATENT DOCUMENTS

| 2,609,212 | 9/1952 | McMurtrie | 280/700 |
|---|---|---|---|
| 3,118,687 | 1/1964 | Forbush | 267/57 |
| 3,243,007 | 3/1966 | Berckhan | 280/721 |
| 3,642,300 | 2/1972 | Klopp | 280/656 |
| 3,685,854 | 8/1972 | Cadiou | 296/204 |
| 3,719,371 | 3/1973 | Musgrave | 280/700 |
| 3,817,556 | 6/1974 | Nyman | 280/400 |
| 4,032,167 | 6/1977 | Chereda | 280/400 |

Primary Examiner—Robert B. Reeves
Assistant Examiner—Dennis H. Pedder
Attorney, Agent, or Firm—Kanz & Timmons

[57] ABSTRACT

On a motorcycle trailer having a torsion bar suspension system a torsion bar communicates a resulting torque from a fixed connection on said trailer to a fixed connection on one floating link of a dual floating link parallelogram wheel suspension strut system so that a generally downward force is exerted on the road wheel by such one floating link pivotally connected between the trailer and the road wheel with further provision for adjusting the height of such wheel by adjusting the axial orientation of the torsion bar with respect to its trailer mounting.

9 Claims, 5 Drawing Figures

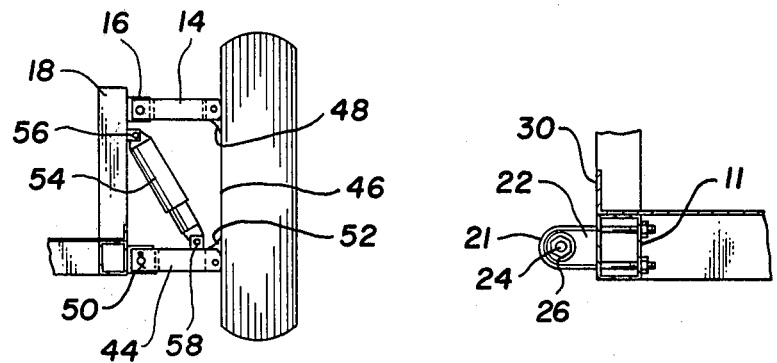
Fig. 2
Fig. 5
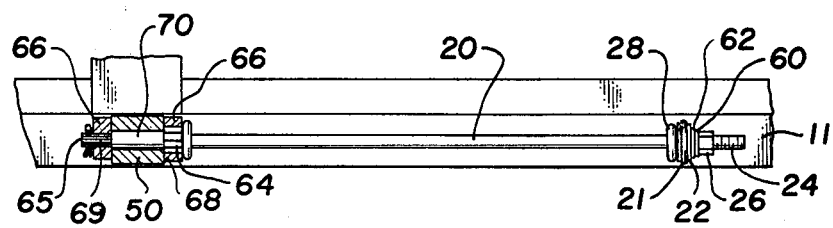
Fig. 3
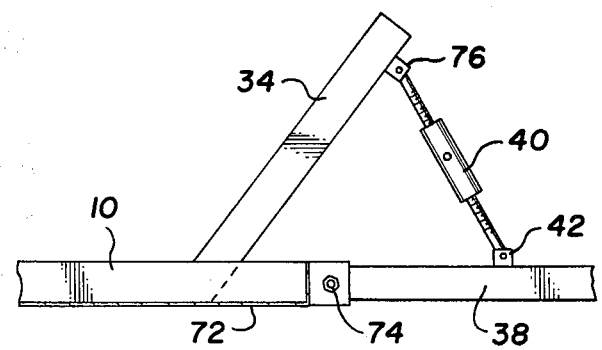
Fig. 4

LOW GROUND CLEARANCE TRAILER

BACKGROUND OF THE INVENTION

This invention relates to motorcycle trailers, and more particularly to a motorcycle trailer having a variable ground clearance torsion bar suspension system.

A vehicular height adjusting mechanism implemented by means of a torsion bar suspension system is shown in U.S. Pat. No. 4,243,247 granted to Kataoka. Such a system commonly includes a torsion bar offset from the axis of the road wheel but parallel to such axis. A suspension axis perpendicular to the wheel axis connects the wheel spindle to a torque tube rotatably connected to the body of a vehicle. The torque tube has a torsion bar disposed within it. The torsion bar has one end connected to the body of the vehicle by means of a bracket.

Motorcycle trailers are used to bring "dirt bikes" to remote locations over rough terrain. In order to avoid overturning the trailer and the consequent ruin of the motor bike, it is desirable that the trailer have as low a center of gravity as possible. The requirement of a low center of gravity for a trailer used on rough terrain places constraints on the design of a trailer undercarriage. The undercarriage should be free of projections that would strike rocks or other elements of rough terrain.

In addition to the increased stability afforded by a low center of balance, this profile is also more appropriate for the cargo handling environment in which the trailer is typically found. A large motorcycle can be loaded or unloaded with less effort as the trailer ground clearance decreases. For recreational uses, loading convenience is particularly important.

While the height adjusting mechanism shown in U.S. Pat. No. 4,243,247 significantly decreases the under carriage space consumed by the torsion bar suspension apparatus, there still remain several undesirable under carriage projections. The transverse torque tube with supporting brackets must be accommodated under the trailer. The presence of these elements beneath the trailer create clearance problems and also expose such elements to the likelihood of damage during use.

There is a need for a torsion bar suspension system wherein the torsion bar is aligned with the direction of travel and thereby presenting as small an area to oncoming hazards as possible. It is also desirable that the torsion bar be disposed at the side of the trailer rather than beneath so that all hazards are avoided. In short, it is desirable that the under carriage of the trailer be completely smooth.

No prior art device meets these criteria. For example, U.S. Pat. No. 2,806,710 granted to Mascaro discloses a trailer having vertically adjustable wheels. The undercarriage of the Mascaro trailer has numerous tranverse members exposed to the hazards of rocky terrain. In addition, the Mascaro apparatus is excessively complicated and bulky.

SUMMARY OF THE INVENTION

It is accordingly an object of the present invention to provide a trailer having an adjustably low center of gravity with a smooth, projection free undercarriage. It is a further object of the present invention to provide a height adjusting mechanism that is simple in structure and operation.

According to the present invention, there is provided a motorcycle trailer having a torsion bar suspension system wherein the torsion bar communicates a resulting torque from its fixed connection on the trailer freeboard to a fixed connection on one floating link whereby a generally downward force is exerted on the road wheel through such one floating link pivotally connected between the trailer and the road wheel. The one floating link is parallel to another floating link similarly connected between trailer and wheel in spaced vertical relation to said one floating link.

According to the present invention, further provision is made for loosening the bond between the trailer and the torsion bar so that trailer freeboard height can be adjusted thereby. This height adjusting feature is complemented by the provision at the front of the trailer of an articulated extension arm for tilting the trailer so that the rear of the trailer can be lowered to accept a two wheeled vehicle from ground level.

BRIEF DESCRIPTION OF THE DRAWINGS

This and other objects and advantages of the present invention will become more apparent from the following description in conjunction with the accompanying drawings, in which:

FIG. 2 is a partial rear elevational view of the dual floating link component of the suspension system;

FIG. 3 is a sectional view along line 3—3 of FIG. 1 showing the connection between the trailer and the torsion bar and showing the manner of connection between the floating link, torsion bar and trailer body pivot element;

FIG. 4 is a partial side elevational view showing the articulated extension arm at the front of the trailer;

FIG. 5 is a partial sectional view along line 5—5 of FIG. 1 showing the attachment of the torsion bar to the trailer frame.

DETAILED DESCRIPTION OF THE PREFERRED EMBODIMENTS

Figure 1:
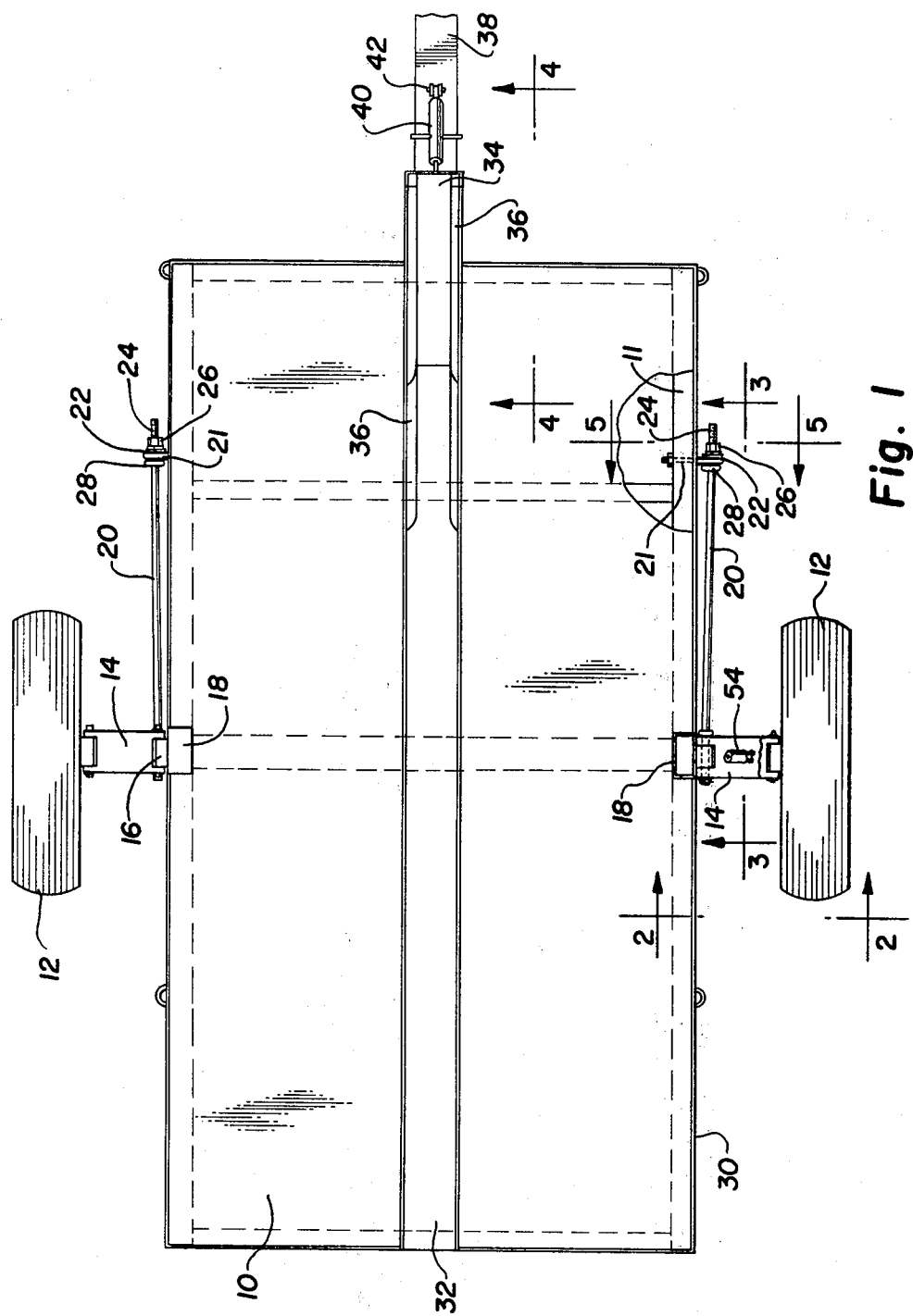
FIG. 1 is a top plan view of a motorcycle trailer having a longitudinal torsion bar suspension system adjustable to vary trailer freeboard height.

Referring now to FIG. 1, there is shown a motorcycle trailer designated generally by reference number 10. Road wheels 12 are connected to the trailer by floating links 14. Pivot bearings 16 depending from pylons 18 provide a pivoting trailer connection for floating links 14.

Torsion bar 20 is shown longitudinal of trailer 10. U-bolt 21 is shown securing drilled block 22 to frame member 11 of trailer 10. Drilled blocks 22 extend from the outside edge of frame member 11 and receive threaded ends 24 of torsion bars 20. Nuts 26 bind annular shoulder 28 of torsion bar 20 to drilled block 22.

At the longitudinal edges of the generally flat, sheet metal covered surface of trailer 10 are raised edges 30. Midway between edges 30 is runway 32 of channel iron. Post 34 diverges upward from runway 32. Filler material 36 within runway 32 and post 34 form a wedge for receipt of the front wheel of a motorcycle.

Articulated extension arm 38 is shown projecting from the front of trailer 10. Turn buckle 40 is shown attached to extension arm 38 at hinged pin 42.

As shown in FIG. 2, first floating link 14 of FIG. 1 is in spaced vertical relationship with second floating link 44. First floating link 14 is shown attached to pylon 18 at pivot bearing 16 and to wheel hub 46 at pivot bearing 48. Second floating link 44 is shown attached to pylon 18 at pivot bearing 50 and to wheel hub 46 at pivot bearing 52. It can be seen that first floating link 14 and second floating link 44 are constantly parallel to one another.

Shock absorber 54 is attached at hinge 56 to pylon 18 and at hinge 58 to floating link 44.

As shown in FIG. 3, torsion bar 20 bears annular shoulder 28. Shoulder 28 is held in substantial abutment with drilled block 22 depending from frame member 11. Threaded end 24 of torsion bar 20 extends through drilled block 22. Nut 26 with lock washer 60 and rough washer 62 are turned onto threaded end 24 to secure torsion bar 20. A knurled surface on annular shoulder 28 binds against an adjacent knurled surface on drilled block 22 to prevent axial slippage of torsion bar 20 relative to drilled block 22. U-bolt 21 rests within an annular recess on drilled block 22 and secures drilled block 22 to frame member 11 as shown by FIG. 5 and by the partial cutaway in FIG. 1.

As shown in FIG. 3, torsion bar 20 is aligned coaxially with pivot bearing 50. Splined pin portions 64 and 65 extend from the end of torsion bar 20. Flange portions 66 extending from second floating link 44 define spline receiving surfaces 68 and 69 for receiving splined pin portions 64 and 65 of torsion bar 20. Splined pin portion 64 of torsion bar 20 comprises splines extending ⅛ inch beyond the diameter of the torsion bar 20. Splined pin portion 65 bears splines defined by longitudinal recesses axial of torsion bar 20 and of a depth of ⅛ inch relative to the diameter of the torsion bar 20. Bearing pin portion 70 is received within pivot bearing 50 for free rotation therein. It can be seen that second floating link 44 is fixed with respect to torsion bar 20. Yet, torsion bar 20 is free to turn within pivot bearing 50 because of the smooth bearing surface presented pivot bearing 50 by bearing pin portion 70.

In FIG. 4 is shown articulated extension arm 38 joined to trailer 10 at tongue 72 by hinge 74. Post 34 is shown extending upward from trailer 10. Turnbuckle 40 applies restraining force between post 34 and extension arm 38. Turnbuckle 40 is pivotally attached to post 34 at hinge 76. Turnbuckle 40 is pivotally attached to articulated extension arm 38 at hinge 42.

In operation, the trailer may be tilted by operation of turn buckle 40. Its freeboard ground clearance may be changed by loosening nut 26 after all torque on torsion bar 20 has been relieved. Nut 26 is tightened to achieve a new freeboard ground clearance.

While a particular embodiment of the present invention has been herein illustrated and described, it is not intended to limit the invention to such disclosure, but changes and modifications may be made therein and thereto within the scope of the following claims.

We claim:

1. In a trailer suitable for towing behind a vehicle such as an automobile or light truck, a suspension height adjusting mechanism comprising:
    (a) a horizontal trailer frame having a generally flat floor surface and having first and second opposite sides;
    (b) at each of said first and second opposite sides of said trailer frame, an upright pylon affixed to said trailer frame extending above the plane of said flat floor surface and having thereon first and second pivot bearings in spaced vertical relationship;
    (c) at each pylon, a wheel hub having first and second pivot bearings in spaced vertical relationship;
    (d) between each pylon and each wheel hub, a first floating link connecting the first pivot bearing of said upright pylon to the first pivot bearing of said wheel hub;
    (e) between each pylon and each wheel hub, a second floating link in spaced parallel relationship with said first floating link and connecting the second pivot bearing of said pylon to the second pivot bearing of said wheel hub;
    (f) on each said opposite side of said trailer and in spaced parallel relationship therewith, a torsion bar having first and second ends;
    (g) means for adjustably fixing said first end of said torsion bar to said trailer frame so that axial rotation is prevented or allowed according to such adjustment wherein, with respect to each of said opposite sides of said trailer frame, the means for adjustably fixing said first end of said torsion bar to said trailer frame comprises:
        (i) a drilled collar block extending from said side of said trailer frame for receiving said first end of said torsion bar;
        (ii) screw threads at said first end of said torsion bar;
        (iii) a raised annular shoulder on said torsion bar;
        (iv) a nut and washer combination for turning onto said screw threads when said screw threads are inserted through said drilled collar block so that said drilled collar block is tightly held between the said annular shoulder and the said nut and washer combination; and
        (v) adjacent knurled surfaces on said annular shoulder and said drilled collar block for binding said torsion bar against axial rotation when said nut and washer combination is turned tightly against said collar block; and
    (h) means for fixing said second end of said torsion bar to said second floating link so that the pivot axis at said second pivot bearing of said pylon is coaxial relative to the torsion axis of said torsion bar.

2. The suspension height adjusting mechanism as claimed in claim 1 further comprising:
    (a) at each pylon, a shock absorber mounted between a point on said pylon slightly below said first pivot bearing of said pylon and a point on said second floating link intermediate between the second pivot bearing of said pylon and the second pivot bearing of said hub so that an angle of approximately 60 degrees is formed between said shock absorber and said second floating link.

3. The suspension height adjusting mechanism as claimed in claim 1, wherein, with respect to each of said opposite sides of said trailer frame, the means for fixing said second end of said torsion bar to said second floating link comprises:
    (a) first and second splined hinge pin portions extending from the second end of said torsion bar;
    (b) spline receiving surfaces on said second floating link axial of said hinge pin; and
    (c) a bearing hinge pin portion intermediate of said first and second splined hinge pin portions so that the second pivot bearing of the pylon receives said bearing hinge pin portion for sliding rotational contact therewith.

4. The suspension height adjusting mechanism as claimed in claim 3 wherein the trailer further comprises:

(a) a floor composed of steel plate having raised edges at the said first and second opposite sides thereof; and
(b) a runway of channel iron on said floor midway between said opposite sides and parallel to said sides for aligning and holding the wheels of a motorcycle to be carried on such trailer frame.

5. The suspension height adjusting mechanism as claimed in claim 4 further comprising:
   (a) an articulated extension arm for connection between said trailer frame and said vehicle;
   (b) pivot means for vertically pivoting said extension arm with respect to said trailer frame about a pivot axis common to both;
   (c) a generally upright post on said trailer forming a substantially continuous channel with respect to said runway but diverging in a vertical direction from said runway; and
   (d) adjustable bracing means connected between said post and said extension arm for controlling the angle at which the said extension arm is maintained with respect to the trailer frame.

6. The suspension height adjusting mechanism as claimed in claim 5 further including
   a wedge within said post and facing away from said articulated extension arm for receiving the front wheel of a motorcycle to be carried on said trailer frame.

7. The suspension height adjusting mechanism as claimed in claim 6 wherein the bracing means comprises a turnbuckle and screw combination connected between the post and extension arm by means of hinge members.

8. The suspension height adjusting mechanism as claimed in claim 7 wherein on each opposite side of said trailer frame the first pivot bearing of the pylon is rotatably connected to the first floating link by an interconnecting hinge pin passing through both the first floating link and the first pivot bearing.

9. The suspension height adjusting mechanism as claimed in claim 8 wherein on each opposite side of said trailer frame the first and second pivot bearings are rotatably connected respectively to the first and second floating links by an interconnecting hinge pin.

* * * * *